United States Patent Office 3,450,701
Patented June 17, 1969

3,450,701
UNSYMMETRICAL ISOCYANURATE
PRODUCTION
Alwyn G. Davies, London, England, assignor to M & T
Chemicals, Inc., New York, N.Y., a corporation of
Delaware
No Drawing. Filed Jan. 24, 1966, Ser. No. 522,400
The portion of the term of the patent subsequent to
Aug. 6, 1985, has been disclaimed
Int. Cl. C07d 55/12; C07f 7/22
U.S. Cl. 260—248                    8 Claims

ABSTRACT OF THE DISCLOSURE

In accordance with certain of its aspects, the process of this invention for preparing useful unsymmetrical isocyanurates comprises condensing one organic isocyanurate with 0.5–1 molar equivalent of an organotin compound $R_3SnOR'$ wherein R is selected from the group consisting of alkyl, aryl, and alkenyl and R' is selected from the group consisting of alkyl, aryl, alkenyl, and —$SnR_3$ thereby forming an organotin carbamate; condensing said organotin carbamate with sufficient amount of at least one other organic isocyanate to form said unsymmetrical isocyanurate; and recovering said unsymmetrical isocyanurate.

---

This invention relates to a process for preparing unsymmetrical organic isocyanurates. This application is a continuation-in-part of U.S. application Ser. No. 486,561, now U.S. Patent No. 3,396,167.

Isocyanurates are compounds which have found use as intermediates, sanitizing agents, bleaches and the like. No completely satisfactory method for preparing isocyanurates has heretofore been known. Methods previously employed may require an extensive period of time and high temperature to obtain complete reaction. Further, products obtained by prior methods may be contaminated with by-products such as carbamates. Moreover, many potentially desirable isocyanurates have not been capable of preparation by prior art techniques. Unsymmetrical isocyanurates have been especially difficult to prepare.

It is an object of this invention to provide a novel process for preparing unsymmetrical isocyanurates. Other objects will be apparent to those skilled-in-the-art from the following description.

In accordance with certain of its aspects, the process of this invention for preparing unsymmetrical isocyanurates comprises condensing one organic isocyanurate with 0.5–1 molar equivalent of an organotin compound $R_3SnOR'$ wherein R is selected from the group consisting of alkyl, aryl, and alkenyl and R' is selected from the group consisting of alkyl, aryl, alkenyl, and —$SnR_3$ thereby forming an organotin carbamate; condensing, said organotin carbamate with sufficient amount of at least one other organic isocyanate to form said unsymmetrical isocyanurate; and recovering said unsymmetrical isocyanurate.

The organic isocyanates which may be used in the practice of this invention may typicaly be monoisocyanates having the structures R''—N═C═O and at least one of R'''—N═C═O and R''''—N═C═O wherein R'', R''', and R'''' may be selected from the group consisting of alkyl, aryl and alkenyl and are different from each other. For example, R'', R''', and R'''' may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, cyclopentyl, cyclohexyl, cycloheptyl, cyclooctyl, etc. R'', R''', and R'''' may be aryl, including phenyl, napthyl, anthryl, phenanthyrl, etc. R'', R''', and R'''' may be alkenyl, including allyl, 1-propenyl, methallyl, buten-2-yl, buten-3-yl, penten-1-yl, hexenyl, heptenyl, octenyl, decenyl, dodencenyl, tetradecenyl, octadecenyl, etc. R'', R''', and R'''' may also bear an inertly substituted radical or substituent. Typical inert substituents which may be present include alkyl, cycloalkyl, aralkyl, alkaryl, alkenyl, ether, halogen, etc. Typical substituted alkyls include trichloromethyl, -3-chloropropyl, 2-ethoxyethyl, benzyl, - 4-methylcyclohexyl, β-phenylethyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3- butenyl. Preferably, one of R'', R''' and R'''' may be phenyl, naphthyl, or lower alkyl, i.e. alkyl containing less than about 10 carbon atoms.

Illustrative isocyanates which may be used include methyl isocyanate, ethyl isocyanate, n-propyl isocyanate, isopropyl isocyanate, n - butyl isocyanate, sec-butyl isocyanate, isobutyl isocyanate, n-octyl isocyanate, phenyl isocyanate, 1-naphthyl isocyanate, vinyl isocyanate, allyl isocyanate, 3-butenyl isocyanate, cyclohexyl isocyanate, benzyl isocyanate, p-tolyl isocyanate, etc. Where these compounds are not readily available, they may be prepared by converting the corresponding carboxylic acid to an azide and then heating the azide in an inert solvent thereby forming the isocyanate in accordance with the Curtis rearrangement thus:

$$R''COOH \rightarrow R''CON_3 \rightarrow R''—N═C═O$$

The isocyanates may also be prepared by reacting an organic sulfate with potassium cyanate thus:

$$R''SO_4 + KNCO \rightarrow R''KOS_4 + R''NCO$$

or by reacting a primary amine with phosgene thus:

$$R''NH_2 + COCl_2 \rightarrow R''NCO + 2HCl$$

In accordance with this invention, there may be employed an organotin compound of the formula $R_3SnOR'$ wherein R is selected from the group consisting of alkyl, aryl, and alkenyl, and R' is selected from the group consisting of alkyl, aryl, alkenyl, and —$SnR_3$. For example, R may be alkyl including methyl, ethyl, n-propyl, isopropyl, n-butyl, isobutyl, sec-butyl, tert-butyl, n-amyl, neopentyl, isoamyl, n-hexyl, isohexyl, heptyl, octyl, decyl, dodecyl, cyclooctyl, etc. R may be aryl, including phenyl, naphthyl, anthryl, phenanthryl, etc. R may be alkenyl, including allyl, 1-propenyl, methallyl, buten-2-yl, buten-3-yl, penten-1-yl, hexenyl, heptenyl, octenyl, decenyl, dodecenyl, tetradecenyl, octadecenyl, etc. R may also be an inertly substituted radical of the type hereinbefore described. Typical inert substituents which may be present include alkyl, cycloalkyl, alkaryl, alkenyl, ether, halogen, etc. Typical substituted alkyls include trichloromethyl, 3-chloropropyl, 2-ethoxyethyl, benzyl, 4-methylcyclohexyl, 4-chlorocyclohexyl, β-phenylethyl, etc. Typical inertly substituted aryls include chlorophenyl, biphenyl, anisyl, tolyl, xylyl, p-nonylphenyl, p-styryl, etc. Typical substituted alkenyls include 4-chloro-2-butenyl, chloroallyl, 4-phenyl-3-butenyl. All of the R groups need not be the same. Preferably, R may be phenyl or lower alkyl, i.e. alkyl containing less than about 10 carbon atoms.

R' may be any of the alkyl, aryl, or alkenyl radicals described for R. R' may also be $R_3Sn$-wherein R has the meaning hereinbefore given, and $R_3SnOR'$ may thus be $R_3SnOSnR_3$ or $(R_3Sn)_2O$.

$R_3SnOR'$ may be a triorganotin alkoxide or aryloxide, such as trimethyltin methoxide, triethyltin ethoxide, tri-n-propyltin ethoxide, triisopropyltin methoxide, tri-n-butyltin methoxide, tri-n-butyltin ethoxide, tri-n-propyltin phenoxide, tri-n-butyltin phenoxide, triphenyltin 2-ethylhexoxide, triethyltin phenoxide, tritolyltin isopropoxide, tribenzyltin methoxide, tri-n-butyltin benzoxide, etc.

R₃SnOR′ may be a bis(triorganotin) oxide such as bis(triethyltin) oxide, bis(tri-n-propyltin) oxide, bis(triisopropyltin) oxide, bis(tri-n-butyltin) oxide, bis(triphenyltin) oxide, bis(tricyclohexyltin) oxide, etc.

The process of this invention may be generally represented as the condensation of 3 moles of at least two different isocyanates to form one mole of unsymmetrical isocyanurate in the presence of R₃SnOR′, as shown in Equations I and II.

(I)
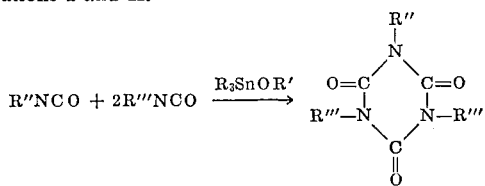

(II)
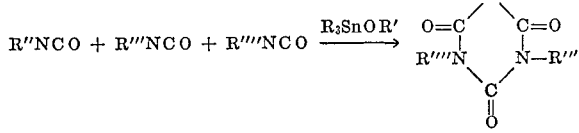

More specifically, it may be supposed that the reaction apparently proceeds in a step-wise manner. The individual steps through which the reaction may proceed may be represented by Equations III, IV, V, and VI wherein three different isocyanates are employed.

(III)
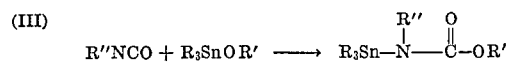

(IV)
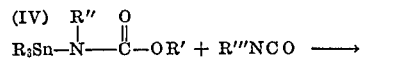

(V)
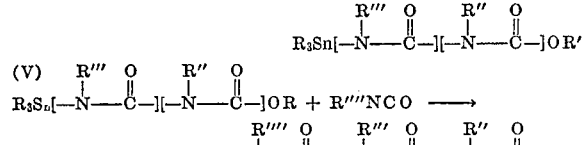

(VI)
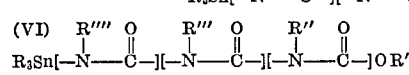

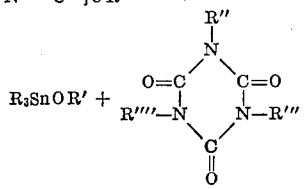

As may be seen from these equations, the organotin compound is regenerated in reaction VI and is thus available for further reaction.

It is a particular feature of this invention that it provides a highly convenient technique for preparing unsymmetrical isocyanurates containing different groups. Prior methods have been restricted to procedures wherein only very specific types of unsymmetrical isocyanurates could be prepared. Such prior methods have co-trimerized mixed isocyanurates thereby producing a mixture of isocyanurates. Separation of desired unsymmetrical isocyanurates was difficult.

For example, the process may be controlled at the carbamate level of Equation III by using about one mole of R₃SnOR′ per mole of isocyanate. It may also be desirable to add the isocyanate incrementally to the R₃SnOR′ in order to prevent local excesses of isocyanate. The carbamate product of Equation III may then be obtained and further reacted with at least two molar equivalents of a second isocyanate according to Equations IV, V, and VI to produce an unsymmetrical isocyanurate wherein there are present two R′′′ groups derived from the second isocyanate. Similarly, it may be possible to control at the dicarbamate level of Equation IV by using about 2 moles of the first isocyanate per mole of R₃SnOR′. The dicarbamate which may be obtained may then be reacted with at least one molar equivalent of a second isocyanate to produce the desired isocyanurate having two R′′ groups derived from the first isocyanate and one R′′′ group derived from the second isocyanate.

It may also be possible to prepare unsymmetrical isocyanurates containing three different groups, R′′, R′′′, and R′′′′. For example, about equimolar amounts of a first isocyanate may be recovered and reacted with a second isocyanate. Preferably, the second isocyanate may be added incrementally to the product of Equation II and equimolar amount or preferably a slight molar deficiency (e.g. about 5%) of the second isocyanate may be employed, to give the product of Equation IV, which product may be reacted with at least one molar equivalent of a third isocyanate according to Equations V and VI to give the unsymmetrical isocyanurate having three different groups R′′, R′′′, R′′′′.

The reactions of this invention typically take place under moderate conditions. Reaction temperatures of about 0° C.–200° C. are generally suitable and temperatures of about 10° C.–100° C. may be preferred. Reaction times are typically of the order of 0.5–500 hours, say 12–36 hours. Because of the reactive nature of the isocyanates and the intermediates present in the process of this invention, it is highly desirable to exclude from the reaction mixture all compounds which have a reactive hydrogen atom, i.e. compounds having active hydrogen atoms as determined by the Zerewitinoff determination.

Typical unsymmetrical isocyanurates which may be formed according to certain aspects of this invention include: dimethyl-1-ethyl isocyanurate, dimethyl-phenyl isocyanurate, diethyl-phenyl isocyanurate, ethyl-diphenyl isocyanurate, methyl-diphenyl isocyanurate, ethyl-di-1-naphthyl isocyanurate, methyl-diisopropyl isocyanurate, diethyl-butyl isocyanurate, methyl-di-2-ethylhexyl isocyanurate, methyl-diphenyl isocyanurate, diphenyl-1-naphthyl isocyanurate.

Practice of this invention may be observed from inspection of the following illustrative examples. All parts except where otherwise indicated are by weight.

EXAMPLE 1

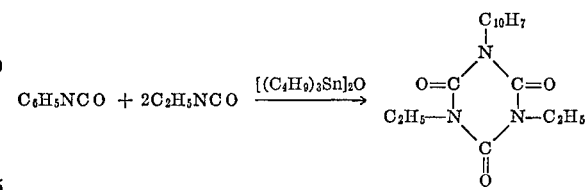

2.936 parts of bis(tri-n-butyltin) oxide and 0.595 parts of phenyl isocyanate may be mixed, providing an exothermic reaction. After cooling, 0.39 parts of ethyl isocyanate may be added. At this point the infrared spectrum may indicate an admixture of ethyl isocyanate and N,O-bis-(tri-n-butyltin)-N-phenyl carbamate,

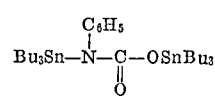

After 10 days some ethyl isocyanate may still be present, but new infrared peaks at 5.95 microns and 13.1 microns may be observed. After 28 days of reaction, the solution may be refrigerator cooled and crystals may be filtered off, washed with pentane, and recrystallized from benzene. The melting point of the product diethyl phenyl isocyanurate may be determined to be 95°–97.5° C.

EXAMPLE 2

$$C_6H_5NCO + 2C_2H_5NCO \xrightarrow{(C_4H_9)_3SnOCH_3}$$

(diethyl-phenyl isocyanurate ring structure with $C_6H_5$ on top N, $C_2H_5$ on the two side N's, and C=O groups)

Diethyl-phenyl isocyanurate may also be prepared by first forming methyl N-phenyl-N-tributyltin carbamate, $$Bu_3Sn\underset{|}{N}\overset{C_6H_5}{\phantom{N}}\underset{\phantom{|}}{\overset{O}{\|}}C\text{—OMe}$$

from 0.047 parts of phenyl isocyanate and 0.128 parts of tributyltin methoxide, and then cooling and adding 0.097 parts of ethyl isocyanate to 0.175 parts of the carbamate. The decay of the isocyanate band at 4.4 microns and the growth of the isocyanurate band at 5.95 microns may be observed on the infrared spectrum. To separate solid diethyl-phenyl isocyanurate, 2 parts of pentane may be added and the reaction vessel refrigerator-cooled. The solid may be filtered off, washed with pentane and recrystallized. The product may be found to have a melting point of 94.5°–97° C. and the infrared spectrum found to be identical to that of the product of Example 7.

EXAMPLE 3

$$2C_6H_5NCO + C_2H_5NCH \xrightarrow{(C_4H_9)_3SnOCH_3}$$

(ethyl-diphenyl isocyanurate ring with $C_2H_5$ on top N and $C_6H_5$ on two side N's)

0.58 parts of phenyl isocyanate may be added to 2.098 parts of methyl N-tributyltin-N-ethyl carbamate, $$Bu_3Sn\underset{|}{\overset{C_2H_5}{N}}\overset{O}{\underset{\phantom{|}}{\|}}C\text{—OMe}$$

which may be formed from 0.380 parts of ethyl isocyanate and 1.718 parts of tributyltin methoxide. The carbamate adduct may be cooled before adding the phenyl isocyanate. After 23 hours, a small amount of crystalline solid may separate and the infrared spectrum may show that all isocyanates had reacted. A considerable amount of crystalline solid may form during the next 6 hours. 5 cc. of pentane may then be added, the solid filtered off, washed and dried. The product ethyl-diphenyl isocyanurate may be found to have a melting point of 156.5°–159° C. and to have been obtained in 67% yield.

EXAMPLE 4

$$C_2H_5NCO + 2C_{10}H_7NCO \xrightarrow{(C_4H_9)_3SnOCH_3}$$

(ethyl-di-1-naphthyl isocyanurate ring with $C_2H_5$ on top N and $C_{10}H_7$ on two side N's)

0.80 parts of 1-naphthyl isocyanate may be added to 2.098 parts of methyl N-tributyltin-N-ethyl carbamate, $$Bu_3Sn\underset{|}{\overset{C_2H_5}{N}}\overset{O}{\underset{\phantom{|}}{\|}}C\text{—OMe}$$

which may be formed from 0.34 parts of ethyl isocyanate and 1.499 parts of tributyltin methoxide. The carbamate adduct may be cooled before adding the 1-naphthyl isocyanate. After 3 days a small amount of crystalline solid may separate and the infrared spectrum may show that all isocyanates had reacted. A considerable amount of crystalline solid may then form during the next 3 days. 5 cc. of pentane may then be added, the solid filtered off, washed and dried. The product ethyl di-1-naphthyl isocyanurate may be found to have a melting point of 202°–204° C. and to have been obtained in 65% yield.

Although this invention has been disclosed by reference to various specific examples, it will be apparent to those skilled-in-the-art that various modifications and changes may be made thereto which fall within the scope of this invention.

I claim:

1. The process for preparing unsymmetrical isocyanurates comprising condensing one organic isocyanate with 0.5–1 molar equivalent of an organotin compound $$R_3SnOR'$$

wherein R is selected from the group consisting of alkyl, aryl, and alkenyl and R' is selected from the group consisting of alkyl, aryl, alkenyl, and —SnR₃ thereby forming an organotin carbamate; condensing said organotin carbamate with sufficient amount of at least one other organic isocyanate to form said unsymmetrical isocyanurate, and recovering said isocyanurate.

2. The process for preparing unsymmetrical isocyanurates as claimed in claim 1 wherein said first mentioned organic isocyanate has the formula R″—N=C=O, and said second mentioned organic isocyanate is at least one member selected from the group consisting of $$R'''\text{—}N=C=O$$

and R″″—N=C=O, wherein R″, R‴, and R″″ are selected from the group consisting of alkyl, aryl and alkenyl and each is different from the other.

3. The process for preparing unsymmetrical isocyanurates as claimed in claim 1 wherein 1 molar equivalent of said organotin compound is employed with respect to said first mentioned organic isocyanate and about 2 molar equivalents of a single second mentioned organic isocyanate are employed with respect to said first mentioned organic isocyanate.

4. The process for preparing unsymmetrical isocyanurates as claimed in claim 1 wherein said first mentioned organic isocyanate is phenyl isocyanate, employed in equimolar amount with respect to said organotin compound; and said second mentioned organic isocyanate is ethyl isocyanate, employed in amount of 2 molar equivalents with respect to said phenyl isocyanate.

5. The process for preparing unsymmetrical isocyanurates as claimed in claim 1 wherein said first mentioned organic isocyanate is ethyl isocyanate, employed in equimolar amount with respect to said organotin compound; and said second mentioned organic isocyanate is phenyl isocyanate, employed in amount of 2 molar equivalents with respect to said ethyl isocyanate.

6. The process for preparing unsymmetrical isocyanurates as claimed in claim 1 wherein said first mentioned organic isocyanate is 1-naphthyl isocyanate, employed in equimolar amount with respect to said organotin compound; and said second mentioned organic isocyanate is ethyl isocyanate, employed in amount of 2 molar equivalents with respect to said 1-naphthyl isocyanate.

7. The process for preparing unsymmetrical isocyanurates as claimed in claim 1 wherein said organotin compound is bis(tributyltin)oxide.

8. The process for preparing unsymmetrical isocyanurates as claimed in claim 1 wherein said organotin compound is tributyltin methoxide.

References Cited

UNITED STATES PATENTS

| | | | |
|---|---|---|---|
| 2,993,870 | 7/1961 | Burkus | 260—248 XR |
| 3,326,906 | 6/1967 | Stamm | 260—248 XR |

HENRY R. JILES, Primary Examiner.

JOHN M. FORD, Assistant Examiner.

U.S. Cl. X.R.

260—77.5, 349, 429.7, 453